United States Patent [19]

Lamb

[11] 3,798,877
[45] Mar. 26, 1974

[54] NOVEL ODOR CONTROL METHOD

[75] Inventor: Norman C. Lamb, Ralston, Nebr.

[73] Assignee: Stauffer Chemical Company, Westport, Conn.

[22] Filed: Dec. 21, 1972

[21] Appl. No.: 317,452

Related U.S. Application Data

[63] Continuation-in-part of Ser. No. 119,767, March 1, 1971, abandoned.

[52] U.S. Cl............ 55/79, 55/97, 55/316, 55/474, 260/708, 260/989
[51] Int. Cl............................ B01d 50/00
[58] Field of Search ........ 55/60, 61, 73, 97, 74–79, 55/316, 387, 389, 474; 260/708, 989

[56] References Cited
UNITED STATES PATENTS

| | | | |
|---|---|---|---|
| 1,825,707 | 10/1931 | Wagner, Jr. | 55/79 |
| 2,492,401 | 12/1949 | Schutte | 55/61 |
| 2,563,543 | 8/1951 | Miller et al. | 55/79 |
| 2,762,452 | 9/1956 | Gains | 55/73 |
| 2,875,847 | 3/1959 | Pring | 55/61 |
| 3,555,787 | 1/1971 | Lustig | 55/316 |

*Primary Examiner*—Bernard Nozick
*Attorney, Agent, or Firm*—Daniel S. Ortiz

[57] ABSTRACT

The invention is an odor control system for use in processes for manufacturing and preparing pesticidal and herbicidal compositions, said process involves the passage of the effluent stream or exhaust gases associated with the manufacturing and handling of the compositions through a zone into which finely divided activated carbon is introduced so as to make contact with the exhaust gases and to become entrained therein prior to the venting of the gases into the atmosphere. This system is particularly useful for controlling the odors which accompany the manufacture and preparation of synthetic organic pesticide and herbicide compositions containing sulfur and particularly phosphorothioate, phosphorodithioate and thiolcarbamate compositions.

26 Claims, 3 Drawing Figures

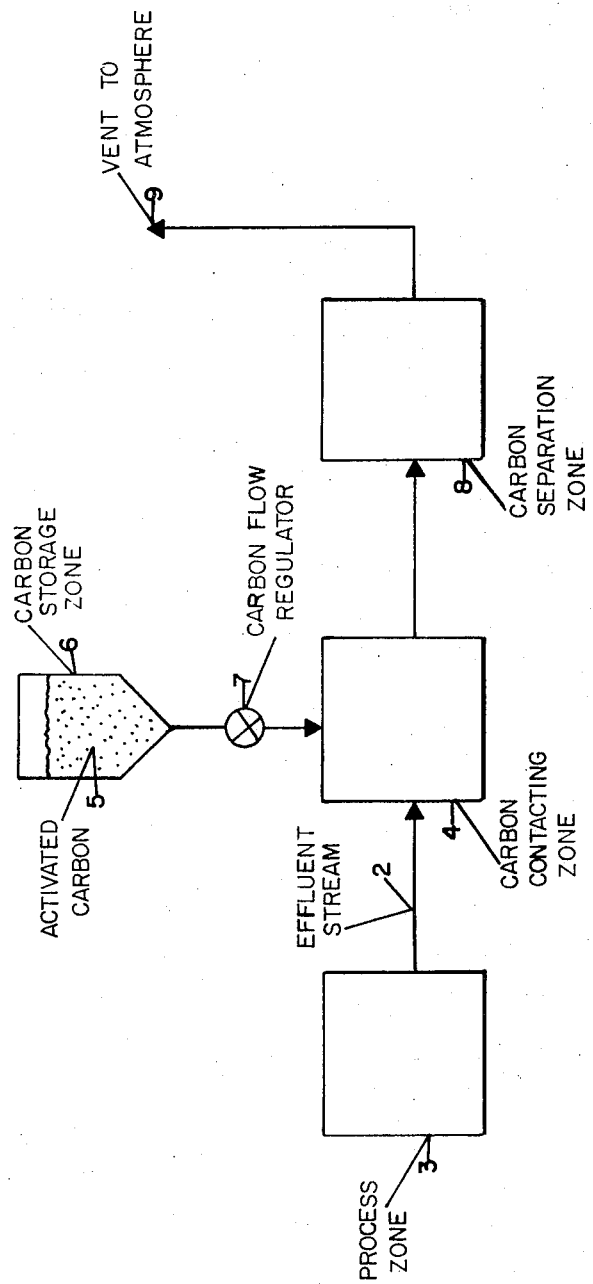

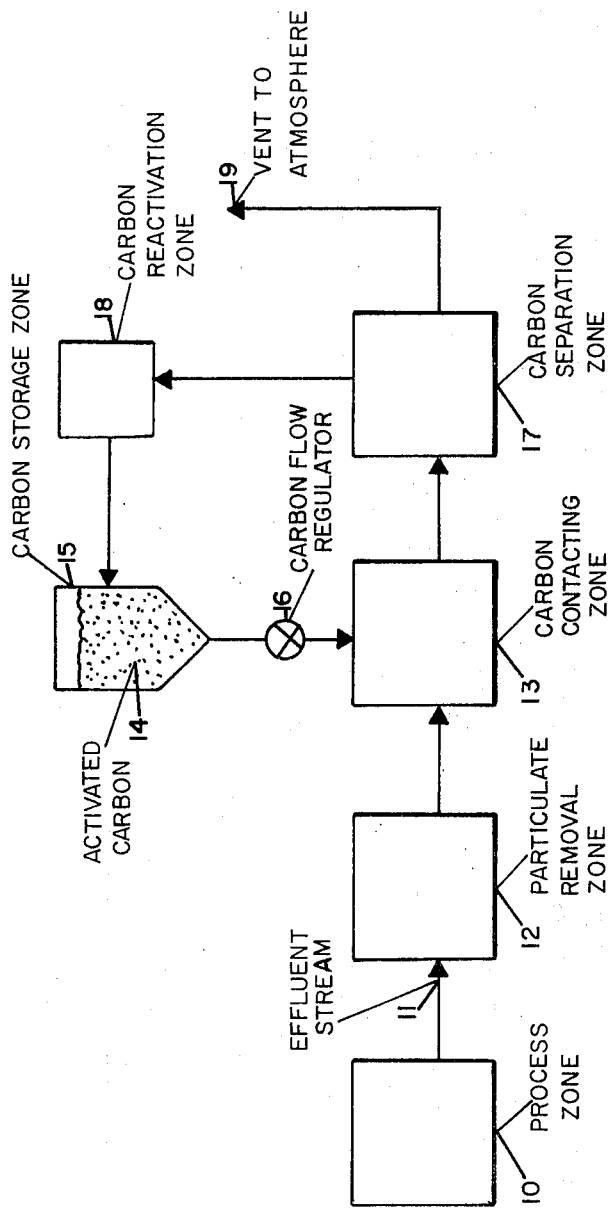

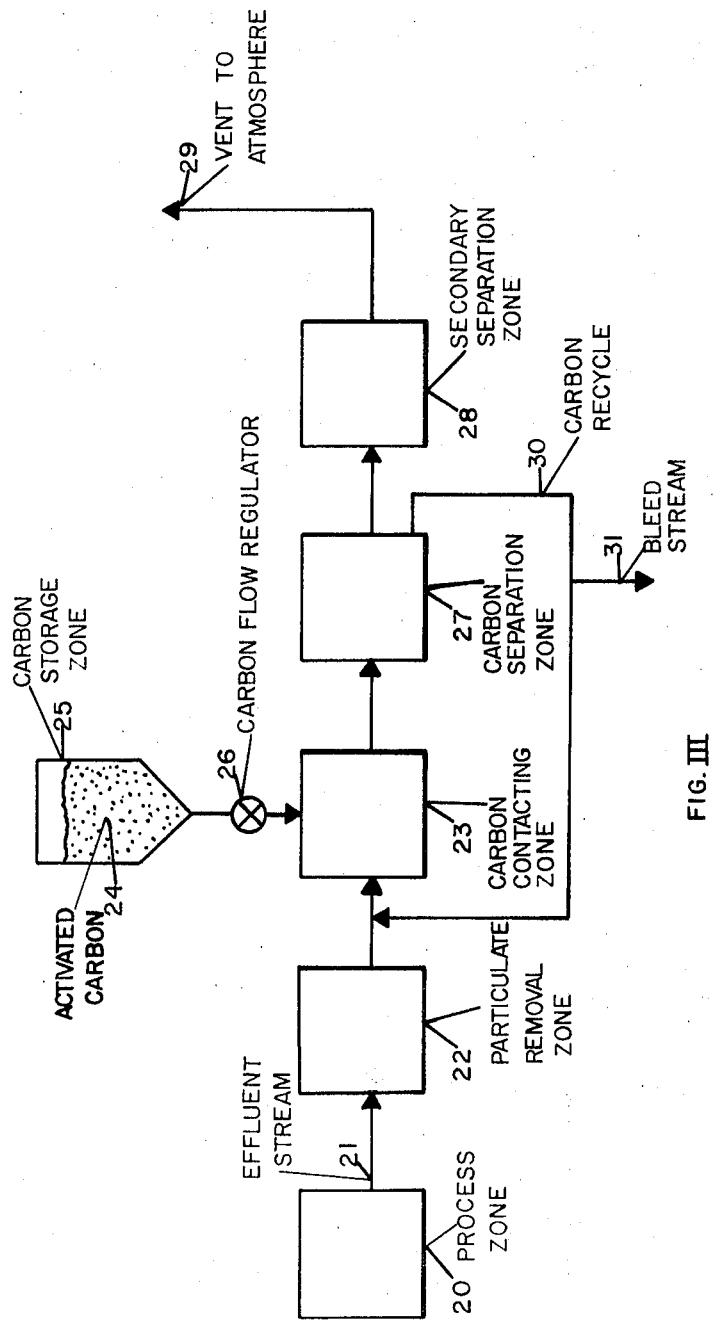
FIG. III

NOVEL ODOR CONTROL METHOD

REFERENCE TO RELATED APPLICATION

This application is a continuation-in-part of application Ser. No. 119,767, filed Mar. 1, 1971 now abandoned.

BACKGROUND OF THE INVENTION

As is known to those skilled in the art, many processes for preparing pesticidal and herbicidal compositions are accompanied by the evolution of odors which may be highly objectionable to persons residing in the area near their source. It is also known that the odorous materials are usually present in relatively small amounts in the gas stream. Although the odor of the gas is unpleasant, the odorous materials are present in such small quantities that they are usually not toxic to plant or animal life. Many different types of odor control systems have been used including such devices as catalytic burners and liquid scrubbers to eliminate or control these odors. In some instances, the incorporation of masking agents or the addition of ozone to the gas stream has also been attempted. The small amounts of odorous material which contaminate large quantities of gases make the treatment of the gas streams difficult on a commercial scale. However, in certain processes, notably the preparation or manufacture of certain pesticides and herbicides none of the various approaches utilized has proven to be completely successful.

It is, therefore, the object of this invention to provide an efficient means for either completely or substantially eliminating obnoxious and unpleasant odors from gas streams which result from the manufacture and preparation of certain pesticides and herbicide compositions. It is a further object of the present invention to provide a method for removing obnoxious odors from large volumes of gases without the need for excessive energy requirements to move the gas through the system.

TECHNICAL DISCLOSURE OF THE INVENTION

It has now been found that the obnoxious and unpleasant odors which are associated with the manufacture and preparation of certain pesticide and herbicide compositions can be substantially reduced or eliminated by passing the effluent stream of exhaust gases which are evolved during the manufacture or preparation of the pesticide and herbicide compositions through a contacting zone into which finely divided activated carbon is introduced so as to make contact with the exhaust gases and to become entrained therein for a sufficient length of time to adsorb the odors to the extent required. In the preferred embodiment the finely divided activated carbon is removed from the exhaust gases which are then vented into the atmosphere.

DETAILED DESCRIPTION OF THE INVENTION

Odors are caused by compounds or combinations of compounds present in small amounts in a gas stream. The compounds are present in such small quantities in the gas stream that it is difficult to determine the compounds or combination of compounds which provide the particularly obnoxious and unpleasant odor. The unpleasant odor is believed due to the impurities and by-products formed during the preparation of the composition or due to the breakdown of the compositions during handling and storage. Whatever the source of the compositions present in the pesticidal and herbicidal compositions, which impart the obnoxious and unpleasant odor to the gas streams which arise during their preparation and handling, the materials are present in extremely small amounts and provide gas streams which are unpleasant to smell. It is understood that the odorous materials can be detected by smell at levels of less than one or 0.1 parts per million in the gas stream. To remove the unpleasant and obnoxious odors from the gas stream it is necessary to substantially completely remove the odorous materials from the gas stream. Analytical techniques to measure such low levels of contamination have proven unsuitable. The sense of smell, since it is capable of detecting the low levels of contamination, have been utilized to determine the effectiveness of the process of the invention.

The odorous bodies which impart an unpleasant and obnoxious odor to the gas streams which have contacted certain pesticide and herbicide compositions are present in extremely small amounts in a large volume of gas. The known methods for eliminating these odors such as scrubbing with liquids that absorb or decompose the odorous compounds or heating the gas stream to thermally decompose the odorous materials have proven unsatisfactory. The odorous materials are present in such small quantities that it is difficult to remove them by the usual scrubbing means and heating a large volume of gas to destroy a small amount of odorous materials has proven to be costly and inefficient.

It is known in the art to introduce finely divided adsorbents into a gas stream to remove certain components from the gas streams. This method for removing materials from a gas stream is known to be inefficient for substantially eliminating components from a gas stream and especially for reducing the concentration of a component in the gas stream to extremely low levels.

U.S. Pat. No. 2,875,844 and U.S. Pat. No. 1,957,251 disclose processes in which a finely divided adsorbent is suspended in a gas stream to effect adsorption. The adsorption efficiency is shown to be low in the process. The adsorption efficiency is increased by forming a bed of the finely divided adsorbent on a filter medium and passing the gas stream through the bed of the finely divided adsorbent. The feature of passing the gas stream through a bed of the adsorbent material is necessary to provide acceptable efficiency in the adsorption process. This is shown in U.S. Pat. No. 2,875,844 where it is disclosed that about 60–65 percent of the adsorption occurs in the suspended material being carried along with the gas stream and an additional 35–40 percent of the adsorption occurs by passing the gaseous stream through the layer of the adsorbent maintained on a filter medium.

U.S. Pat. Nos. 1,577,534 and U.S. Pat. No. 2,492,401 disclose processes wherein materials are adsorbed from gas streams by introducing the adsorbent into the gas stream in the finely divided form and carrying the finely divided adsorbent in the gas stream. The processes disclosed are not taught as substantially completely removing any component from the gas stream.

Applicant has unexpectedly discovered that the obnoxious and unpleasant odorous components which are associated with the manufacture and preparation of certain pesticidal and herbicidal compositions can be selectively removed from gas streams to levels below which they are not detectable by smell. Other components present in the gas stream which are not responsible for the obnoxious and unpleasant odors remain in the gas stream to an appreciable extent. Applicant has unexpectedly discovered that the odorous materials which are present in small quantities are removed to undetectable levels by finely divided activated carbon suspended in the gas stream. The odorous materials are removed much more effectively in shorter times than other materials which may be present in the gas streams. The selective adsorption of the odorous materials and their removal from the gas stream to levels below which they are not detectable by smell is unusual and unexpected in view of the teachings of the prior art which disclose that in addition to dispersing the particulate adsorbent in the gas stream it is necessary to pass the gas stream through a bed of the finely divided adsorbent to effectively remove vapors from the gas stream.

The process of the present invention is useful for removing the odorous materials from gas streams which have been in contact with certain organic insecticide, herbicide and fungicidal compositions which have sulfur in the molecule and particularly which have sulfur in combination with carbon, nitrogen, phosphorus and oxygen moieties and in particular organic phosphorothioate, phosphonothioate, phosphorodithioate, phosphonodithioate and thiolcarbamate compositions. The odorous materials are believed to be formed as by-products during the preparation of the composition and by breakdown of the composition or by-products during handling and storage. The sulfur containing insecticidal and herbicidal compositions in particular, the phosphorothioate, phosphorodithioate and thiolcarbamate compositions are well known in the art and their method of preparation is well documented in the technical literature. The process of the present invention is particularly effective in removing odors from gas streams which arise in the manufacture or preparation of compositions containing the following pesticide, herbicide and fungicide compositions.

O,O-Diethyl S-2-diethylaminoethyl phosphorothioate; O,O-Diethyl S[4-oxo-1,2,3-benzotriazin-3-(4H)ylmethyl] phosphorodithioate; O,O-dimethyl S[4-oxo-1,2,3-benzotriazin-3(4H) ylmethyl] phosphorodithioate; Bisdimethylaminocarbamoyl disulphide; O-4-(4-Chlorophenylazophenyl) O,O-dimethyl phosphorothioate; S-(O,O-diisopropyl phosphorodithionate of N-(2-mercaptoethyl) benzenesulfonamide; 1,3-bis(carbamoylthio)-2-(N,N-dimethylamino)propane hydrochloride; O,O-bis(p-chlorophenyl) acetimidophosphoroamidothioate; Bis(4-chlorophenyl)disulfide; S-bis(4-chlorophenyl)methyl O,O-diethyl phosphorodithioate; S-Bis(4-chlorophenyl)methyl O,O-dimethyl phosphorodithioate; Bis(dialkylphosphinothioyl) disulfide; Bis(dimethylthiocarbamyl)-ethylene bisdithiocarbamate; Bis(dimethylthiocarbamylthio) methyl arsine; 2,2-Bis(ethylthio)-vinyl diethylphosphate; Bis(ethylxanthic) disulfide; Bis(2-thiocyanoethyl) ether; O-(2-bromo-4-nitrophenyl-)O,O-dimethyl phosphorothioate; O,O-dimethyl-O-2,5-dichloro-4-bromophenylthionophosphate; O,O-diethyl-O-2,5-dichloro-4-bromophenyl-thionophosphate; O-n-butyl-S-benzyl-xanthate; O-(4-tert-butyl-2-chlorophenyl) O-methyl phosphoroamidothionate; tert-butylpropylthiolcarbamate; O,O-diethyl S-(p-chlorophenylthiomethyl)phosphorodithioate; 2-chloroallyl diethyldithiocarbamate; p-Chlorobenzyl p-chlorophenyl sulfide; O-[2-chloro-1-(2,5-dichlorophenyl)vinyl] O,O-diethyl phosphorothioate; S-(p-chloro-α-phenylbenzyl) O,O-diethyl phosphorodithioate; 5-chloro-4-phenyl-1,2-dithiol-3-one; O-p-chlorophenyl O-ethyl ethylphosphonothioate; O-p-chlorophenyl O-propyl ethylphosphonothioate; S-(2-chloro-1-phthalimidoethyl) O,O-phosphorodithioate; 2-(2,4-dihydroxyphenyl)-1-cyclohexene-1-carboxylic acid-γ-lactone O,O-diethylphosphorothioate; S-N-(1-cyano-1-methylethyl) carbamoylmethyl diethyl phosphorothiolate, cyanthoate; O-Ethyl O-p-cyanophenyl phenylphosphonothioate; Cyclic ethylene (diethoxyphosphinothioyl)dithioimidocarbonate; cyclic ethylene (dimethoxyphosphinothioyl)dithioimidocarbonate; cyclic propylene S-(and O,O-diethyl S- O)-2-ethylthio)ethyl phosphorothioates; S-2,3-dichloroallyl N,N-diisopropylthiolcarbamate; diammonium ethylenebisdithiocarbamate; O,O-diethyl O-(2-isopropyl 4-methyl-6-pyrimidyl) phosphorothioate; O-(2-Chloro-4-nitrophenyl) O,O-dimethyl phosphorothioate; O-2,4-dichlorophenyl O-ethyl ethylphosphonothioate; O-2,5-dichlorophenyl O-ethyl ethylphosphonothioate; O-2,4-dichlorophenyl O-methyl methylphosphonothioate; α-(diethoxyphosphinothioylthio)gamma-butyrolactone; O,O-diethyl S-acetonyl phosphorodithioate; O,O-diethyl O-2 (sec-butoxymethylthio) ethyl phosphorothioate; O,O-diethyl S-carboethoxyethyl phosphorodithioate; O,O-diethyl S-carboethoxyethyl phosphorothioate; O,O-diethyl S-carbo-ethoxymethyl phosphorodithioate; O,O-diethyl S-(Carbomethoxymethyl) phosphorodithioate; O,O-diethyl S-(p-chlorobenzyl) phosphorodithioate; O,O-diethyl O-3-chloro-4-methyl-1-oxo-2H-1-benzopyran-7-YL phosphorothioate; O,O-diethyl S-(alphacyanobenzyl) phosphorodithioate; O,O-diethyl S-(3,4-dichlorophenylthio)methyl phosphorothioate; O,O-diethyl O-(2,4-dichlorophenyl) phosphorothioate; O,O-diethyl S-2-(diethylaminoethyl) phosphorothioate; O,O-diethyl S-(2-diethylamino) ethyl phosphorothioate hydrogen oxalate; O,O-diethyl-O-(2-dimethylamino-4-methylpyrimidin-6 YL) phosphorothionate; O,O-diethyl S-(ethoxycarbonylcarbamoyl)-methyl phosphorodithioate; O,O-diethyl S-(N-ethoxycarbonyl-N-methylcarbamoylmethyl) phosphorodithioate; O,O-diethyl O-(ethoxycarbonyl)-methyl phosphorothioate; O,O-diethyl O-(ethoxycarbonylthio) ethyl phosphorothioate; O,O-diethyl S-(2-ethylsulfonylethyl) phosphorodithioate; O,O-diethyl O-(2-ethylsulfonylethyl) phosphorothioate; O,O-diethyl S-ethylsulfonylmethyl phosphorodithioate; O,O-diethyl S-(2-ethylthionylethyl) phosphorodithioate; O,O-diethyl S-ethylthionylmethyl phosphorodithioate; O,O-diethyl-S-(Isopropylthiomethyl) phosphorodithioate; O,O-diethyl S-methylcarbamoylisopropyl phosphorodithioate; O,O-diethyl O-(3-methyl-5-pyrazolyl) phosphorothioate; O,O-diethyl O-p-(methylsulfinyl)phenyl phosphorothioate; O,O-diethyl O-(4-methylthio-m-tolyl) phosphorothioate; O,O-diethyl O-(4-methylthio-3,5-xylyl) phosphorothioate; O,O-diethyl O-(4-methylumbelliferone) phosphorothioate; O,O-diethyl O-naphthylamido phosphorothioate; O,O-diethyl S-pentachlorophenyl phosphorothioate; O,O-diethyl O-(m-pentadecylphenyl) phosphorothioate; O,O-diethyl phosphorazidothioate; O,O-diethyl phosphorothioate anhydride with N,N-bis(dimethylamidophosphate); O,O-diethyl S- phthalimidomethyl phosphorothioate; O,O-diethyl O-(2-n-propyl-4-methyl-6-pyrimidyl) phosphorothioate; O,O-diethyl S-(propylthiomethyl) phosphorodithioate; O,O-diethyl S-(2-propynyl) phosphorothioate; O,O-diethyl O-[6-3(2H)-pyridazinonyl)] phosphorothioate; O,O-diethyl O-3,5,6-trichloro-2-pyridyl phosphorothioate; O,O-diisopropyl S-(p-chlorobenzyl) phosphorodithioate; O,O-diisopropyl S-diethyldithiocarbamoyl phosphorodithioate; O,O-diisopropyl S-(diethylthiocarbanyl) phosphorodithioate hydrosulfide; O,O-diisopropyl-S-ethylsulfinyl methyl dithiophosphate; O,O-diisopropyl S-(isopropylthiomethyl) phosphorodithioate; O,O-dimethyl S-(N-methylcarbamoylmethyl) phosphorodithioate; O,O-dimethyl-S-2-(acetylamino) ethyl dithiophosphate; O,O-dimethyl S-carbamoylcarbamoylmethyl phosphorodithioate; O,O-dimethyl S-carbamoylmethyl phosphorodithioate; O,O-dimethyl S-carboethoxymethyl phosphorothioate; O,O-dimethyl S-(p-chlorobenzyl) phosphorodithioate; O,O-dimethyl O-3-chloro-4-methyl-1-oxo-2H-1-benzopyran-7-YL phosphorothioate; O,O-dimethyl O-(3-chloro-4-nitrophenyl) phosphorothioate; O,O-dimethyl O-(4-chloro-3-nitrophenyl) phosphorothioate; O,O-dimethyl S-(p-chlorophenylthio) methyl phosphorodithioate; O,O-dimethyl-O-p-cyanophenyl phosphorothioate; O,O-dimethyl S-(3,4-dichlorophenylthio)methyl phosphorodithioate; O,O-dimethyl S-(2-dimethylaminoethyl) phosphorothioate; O,O-dimethyl O-(3,5-dimethyl-4-methylthiophenyl) phosphorothioate; O,O-dimethyl O-p-(dimethyl sulfamoyl) phenyl phosphorothioate; O,O-dimethyl S-(N-ethylcarbamoylmethyl) phosphorodithioate; O,O-dimethyl [(2-hydroxypropyl)-methylthiocarbamoyl] phosphoramidothioate; O,O-dimethyl S-(2-isopropyl) ethylsulfinyl phosphorodithioate; O,O-dimethyl-S-[2methoxy-1,3,4-thiadiazol-5-(4H)-onyl-(4)-methyl phosphorodithioate; O,O-dimethyl-s-[2-(1-methylcarbamoylethylthio)-ethyl] phosphorodithioate; O,O-dimethyl S-2-(methylsulfinyl)-ethyl phosphorothioate; O,O-dimethyl O-(p-methylsulfinylphenyl) phosphorothioate; O,O-dimethyl O-[4-(methylthio)-m-tolyl] phosphorothioate; O,O-dimethyl O-(4-methylumbelliferone) phosphorothioate; O,O-dimethyl ortho-nitrobenzyl phosphorodithioate O,O-dimethyl para-nitrobenzyl phosphorodithioate; O,O-dimethyl O-(4-nitro-m-tolyl) phosphorodithioate; O,O-dimethyl phosphorothioate O-ester with 6-hydroxy-3(2H)-pyridazinone; O,O-dimethyl S-phthalimidomethyl phosphorodithioate; O,O-dimethyl S-phthalimidomethyl phosphorothioate; O,O-dimethyl S-(1-succinimidoethyl) phosphorodithioate; O,O-dimethyl O-p-sulfamoylphenyl phosphorothioate; Dimethyl xanthic disulfide; 2,3-p-dioxane S,S-bis(O,O-diethylphosphorodithioate); O,O-dipropyl S-(p-chlorobenzyl)phosphorodithioate; O,O-diethyl S-2-(ethylthio)ethyl phosphorodithioate; O-(2,4-dichlorophenyl) O-methyl isopropylphosphoramidothioate; S-[(5-methoxy-4-oxo-4H-pyran-2-yl)methyl] O,O-dimethyl phosphorothioate; O-ethyl O-p-nitrophenyl phenylphosphonothioate; O,O,O',O'-Tetraethyl S,S'-methylene bisphosphorodithioate; O,O-diethyl O-(2-chloro-4-nitrophenyl)phosphorothioate; Ethyl N-(2-(O,O-dimethyl phosphorodithioyl)ethyl) carbamate; O-ethyl S,S-dipropyl phosphorodithioate; O-ethyl o-p-(ethylsulfinylphenyl) methylphosphonothioate; O-ethyl O-(p-ethylthio)phenyl methylphosphonothioate; O-ethyl O-(p-methylthio) phenyl methylphosphonothioate; O-ethyl O-(4-methylthio-m-tolyl) methylphosphoramidothioate; O-ethyl-S-phenyl-ethylphosphonodithioate; Ethylphosphonodithioic acid, O-isobutyl ester, S-ester with N-(mercaptomethyl) phthalamide; O-p-(ethylsulfamoyl)-phenyl O,O-dimethyl phosphorothioate; O-ethyl S-p-tolyl ethylphosphonodithioate; O-ethyl-O-2,4,5-trichlorophenyl ethylphosphonothioate; O-ethyl O-(2,4,5-trichlorophenyl) methyl phosphoramidothioate; 2-fluoroethyl mercaptophenylacetate, O,O-diethyl phosphorodithioate; O,O-dimethyl S-(N-formyl-N-methylcarbamoyl-methyl) phosphorodithioate; O-isopropyl O-(2-chloro-4-nitrophenyl) ethylphosphonothioate; Isopropyl mercaptophenylacetate, O,O-dimethyl phosphordithioate; O-p-(isopropylsulfamoyl) phenyl O,O-dimethyl phosphorothioate; S-[1,2-bis(ethoxycarbonyl)ethyl] O,O-dimethyl phosphorodithioate; S-(N-methoxymethylcarbamoylmethyl) dimethyl phosphorothiolothiononate; O,O-dimethyl-O-2(ethylthio)ethyl phosphorothioate; O,O-dimethyl-S-2(ethylthio)ethyl phosphorothioate; O-methyl O-(methyl-4-methylthiophenyl) ethylphosphonothioate; O,O-dimethyl O-p-nitrophenyl phosphorothioate; O,O-dimethyl S-(2,5-dichlorophenylithio)-methyl phosphorodithioate; O-methyl S-phenyl methylphosphonodithioate; O-methyl O-(2,4,5-trichlorophenyl) amidophosphorothioate; S-Ethyl hexahydro-1H-azepine-1-carbothioate; O,O-dimethyl S-(morpholinocarbonylmethyl) phosphorodithioate; O,O-diethyl-O-p-nitrophenyl phosphorothioate; S-propylbutyl-ethylthiocarbamate; Ethyl mercaptophenylacetate O,O-dimethyl phosphorodithioate; Phenylglyoxylnitrile oxime O,O-diethyl phosphorothioate; O,O-diethyl S-(6-chloro-2-oxobenzoxazolin-3-yl) methyl phosphorodithioate; O,O-diethyl-S-(N-isopropylcarbamoylmethyl)-phosphorodithioate; Dimethyl 2,4,5-trichlorophenyl phosphorothionate; O,O,O,O-tetraethyl dithiopyrophosphate; Tetra-n-propyl dithiopyrophosphate; O,O-dimethyl S-(2-(ethylthio)ethyl phosphorodithioate; O,O-Diethyl O-2-pyrazinyl phosphorothioate; Toluene-alpha,alpha-dithiol bis(O,O-dimethyl phosphorodithioate); O,O-dimethyl S-[2-(1-methylcarbamoylethylthio)ethyl] phosphorothioate.

The commercially prepared or technical pesticide, herbicide and fungicide compositions are usually not pure compounds but contain from about 90 to about 98 percent of the active ingredient. The remaining portion of the commercially prepared compositions are usually difficult to separate unreacted raw materials, reaction by-products or decomposition products. The impurities do not affect the activity of the active component and the level of impurities is taken into consideration when preparing pesticide and herbicide formulations containing the active ingredients. Minor amounts of impurities contribute to the obnoxious and offensive odors which the compositions impart to gas streams which they contact.

One of the severest odor problems arises when the pesticide or herbicide composition is prepared in a form in which it can be readily applied to the land or the crops. In one form the pesticide or herbicide composition is diluted with an inert finely divided diluent to form a powder containing from about 1 percent to about 50 and usually 3 to about 30 percent by weight of the pesticide or herbicide. In preparing the powder containing the pesticidal or herbicidal compositions, the powder is usually prepared in a wettable form so that it can be readily dispersed in an aqueous medium.

In preparing the powder the active pesticide or herbicide composition, wetting agents or other materials in the formulation in the form of a liquid, solid or solutions are mixed and dispersed in a finely divided inert carrier. To properly disperse the pesticide or herbicide compositions throughout the inert carrier mixing apparatus grinders and classifier are usually utilized. Contamination of the area surrounding the equipment is prevented by maintaining a dust collection or product recovery system operating at a pressure less than atmospheric so that the pesticide or herbicide compositions do not pervade the atmosphere in the plant. Air from the mixing or grinding apparatus or from dust collection equipment located in the areas around the mixing and bagging equipment is drawn into the dust collection system. The air drawn into the equipment has contacted the dispersed pesticide or herbicide composition. In contacting the dispersed form of the compositions the air stream or gas stream becomes contaminated with the pesticidal or herbicidal compositions and in addition becomes contaminated with the odorous materials which contaminate the active ingredients. The air stream is usually passed through a collection means wherein the particulate materials which have been entrained in the gas stream are removed and the gas stream containing small amounts of the pesticide or herbicide composition and smaller amounts of the odorous materials are passed to a means for removing the odor from the gas.

In the process of the present invention, the gas stream containing the odorous or odoriferous materials is passed through an adsorbent contacting zone where finely divided activated carbon is dispersed in the gas stream. The adsorbent contacting zone is a conduit of such dimensions that the velocity of the gas passing through the conduit is sufficient to maintain the adsorbent suspended in the gas stream and carry the adsorbent for a sufficient length of time to permit contact between the adsorbent and the gas stream to remove the odorous materials therefrom. In a preferred embodiment of the invention, activated carbon is admitted to the gas stream at the inlet end of the odor removal zone conveyed while suspended in the gas stream for a sufficient length of time to remove the obnoxious and unpleasant odors to a level at which they are not objectionable when introduced into the environment. The adsorbent is preferably carried in the gas stream for from about 0.2 to about 15 seconds but longer times are not harmful to the process and can increase the removal of materials other than the odorous compositions from the gas stream. The length of time of contact required to remove the unpleasant and obnoxious odors from the gas stream is dependent upon the type of odorous materials present in the gas stream, the ratio of absorbent to odorous material, the velocity of the gas stream in the conduit, and the amount of contamination initially present in the gas stream. The odorous material is substantially completely removed from the gas stream by this procedure. At the end of the contacting zone, the gas stream containing the adsorbent suspended therein can be further treated to separate the adsorbent from the gas stream. The adsorbent can be separated from the gas stream by a known means such as electrostatic precipitation, liquid scrubbing, cyclones, settling chambers, bag filters and the like. The odor removal is not dependent upon any particular means of removing the adsorbent from the gas stream since the odorous material is firmly adsorbed on the adsorbent. Separation of the adsorbent from the gas stream is however usually advantageous.

Activated carbon is the preferred adsorbent for practice of the present invention. It is preferred to utilize at least about 1½ to 2 times the amount of activated carbon which would be required to adsorb the odorous materials from the gas stream if the activated carbon were to become saturated with the odorous materials at the concentration present. Use of larger amounts of activated carbon is not harmful to the process and can provide a substantial reduction in levels of materials other than the odorous components in the gas stream. It is preferred to utilize from about three to about 20 times the amount of activated carbon which would be required to absorb the odorous materials from the gas stream. Large excesses of activated carbon are utilized in many cases since the actual amounts of activated carbon required to adsorb the odorous materials is relatively small and the small quantities of activated carbon connot be reliably added continuously to a gas stream. Usually from about 0.05 to about 10 pounds of activated carbon per day per 1,000 cubic feet per minute of contaminated gas is sufficient to remove the odorous materials from the gas stream. That is, from about 0.05 to about 10 pounds of activated carbon can effectively remove the unpleasant and obnoxious odors from about 1,440,000 cubic feet of gas.

The gas containing the odorous material is passed into the conduit into which is admitted the finely divided activated carbon. The gas must have a sufficient velocity to maintain the activated carbon suspended in the moving gas stream and to carry the activated carbon along with the movement of the gas stream. The activated carbon should be suspended in a gas stream for a sufficient length of time to reduce the odor in the gas stream to the desired level. The gas stream is usually not odor free and contains substantial levels of unadsorbed material. However, the odor which remains is faint and not unpleasant. The obnoxious and unpleasant odorous materials are removed from the gas stream to levels at which they are not detectable by smell.

Attempts to determine the nature and concentration of the odorous materials in the gas stream have not proved successful. Samples of the odorous and the treated gas streams have been analyzed by gas chromatography but no significant differences in the chromatographic patterns was shown. The gas streams were passed through scrubbers containing hydrocarbon absorbents to attempt to conecntrate the odorous materials. The absorbents were analyzed by gas chromatography. The only significant pattern detected in the odorous and odor free gas streams are attributed to the pesticide or herbicide compositions which have contacted the gas stream. During contact with the activated carbon, the herbicide and pesticide compositions in the gas stream have been reduced in an amount of about 50 to 60 percent of the original concentration. Since the concentration of the pesticide and herbicide composition have not been substantially reduced, and it is known that when these materials are pure they do not have an unpleasant odor, it is certain that the pesticide and herbicide materials are not the odorous components of the gas stream.

When the gas stream has contacted a liquid or powder material containing the pesticide or herbicide compositions the gas stream may have entrained therein, liquid droplets or small solid particles of the formulation. In a preferred embodiment of the present invention, the particulate material containing the herbicide or pesticide composition is separated from the gas stream. The gas stream after having the particulate materials separated therefrom is then contacted with the activated carbon in the absorption zone for a sufficient length of time to remove the odorous materials. The activated carbon is then separated from the gas stream.

The novel process of this invention will now be described in greater detail with reference being made to FIGS. I–III in the appended drawing which depict flow diagrams illustrating the different phases of various preferred embodiments of the subject process. It is to be understood, however, that these flow diagrams are merely representative and that the process of this invention may be altered in many of its details by those skilled in the art while still remaining within the intended scope of the invention.

Thus, FIG. I in the appended drawing illustrates the basic operation of the process of this invention whereby the effluent stream of gases 2 emerging from the process zone 3 of the manufacturing process enters a carbon contacting zone 4 into which there is introduced powdered activated carbon 5 which is contained within a carbon storage zone 6 having a suitable means 7 for regulating its flow into the stream of exhaust gases within the carbon contacting zone. Upon entering the carbon contacting zone, the particles of the finely divided activated carbon make contact with and are entrained in the flow of the effluent stream of exhaust gases thereby adsorbing the various gaseous, vaporous and colloidal solid odor forming contaminants which are present therein. The effluent, having the finely divided, activated carbon particles entrained in its moving stream, then proceeds to pass out from the carbon contacting zone 4 and into a carbon separation zone 8 which contains suitable means for removing the particles of finely divided, activated carbon, as well as any other particulate contaminants which may be present, from the effluent stream of exhaust gases prior to their being vented into the atmosphere 9.

By means of this procedure, it is possible to remove most, if not all, of the odor forming components which are present in the effluent stream. More particularly, the exposure of the effluent stream, within the carbon contacting zone, to the finely divided, activated carbon while the particles thereof are entrained therein serves to remove, via adsorption, a broad spectrum of odor forming gases, vapors and colloidal solids. Thereafter, its passage through the carbon separation zone serves to remove the activated carbon particles as well as any other particulate materials, from the effluent stream prior to its being vented into the atmosphere.

It is, however, to be emphasized at this point, that the truly novel aspect of the process of this invention resides in the discovery that the odorous materials can be selectively removed from the gas stream by the step of passing the effluent stream through the carbon contacting zone wherein it comes into contact with and thereby entrains, i.e. carries along, the particles of finely divided activated carbon. This step makes it possible for the adsorptive powers of the activated carbon to be utilized to their maximum capacity inasmuch as the individual particles of the entrained carbon are essentially fully surrounded or enveloped by the flow of the effluent stream of exhaust gases. Accordingly, the entire surface area of each individual particle of activated carbon is free to adsorb the odor forming components within the effluent.

The odor control process of this invention will be found, with appropriate modification, to be operable with a wide variety of processes involving the manufacture and preparation of herbicidal and pesticidal compositions. Especially the process which prepare or manufacture compositions containing organic sulfur moieties and organic sulfur moieties containing nitrogen, oxygen, phosphorus or combinations of these moieties.

In greater detail now, and with further reference to FIG. I, the operation of the odor control process of this invention will ordinarily begin by directing the effluent stream of exhaust gases 2 from their place of origin in the process zone 3 into the carbon contacting zone 4. The use, in this disclosure, of the term "process zone" is meant to encompass any potential odor source in a manufacturing or allied process which includes, for example, vessels or reactors in which a chemical reaction is being conducted, warehouses or buildings which are being ventilated subsequent to fumigation or the storage therein of odorous materials, vessels or tanks where odorous materials are being blended, containers or tanks used for the storage of odorous materials, ovens, etc. The effluent stream will, in most instances, be moved from the process zone into the activated carbon contacting zone by means of a suitable blower, fan, or other type of ventilating or air moving apparatus which also serves to move the effluent stream out from the carbon contacting zone, through the carbon separation zone and to finally vent it out into the atmosphere. It should be noted, at this point, that the process of this invention will generally be conducted as an essentially continuous, or campaign, operation in which a constant stream of effluent is continually passed from the process zone and then into and out from the carbon contacting zone. However, if desired, this process may be conducted as a batch-wise operation in which there is an intermittent or interruped flow of effluent from the process zone and into and out from the carbon contacting zone.

In its simplest and preferred embodiment, the carbon contacting zone will comprise a conduit in the form of a length of pipe or tubing which may be made from metal, rubber or synthetic plastic or other material which will not be unduly corroded or otherwise damaged by the contents of the effluent which will be passed through it. The finely divided activated carbon 5 should be introduced into the carbon contacting zone at a point where its individual particles will be able to achieve an optimum amount of retention time while entrained within the moving effluent stream.

This may be accomplished either by decreasing the flow rate of the effluent stream or, more conveniently, by increasing the volume within the carbon contacting zone. Thus, where the contacting zone is in the form of a conduit, such as a pipe or tube, this volume increase may be readily affected by having the activated carbon enter the conduit at a point, therein, which is as far upstream towards the process zone as is possible. This requires the inlet for the activated carbon to be positioned as closely as is convenient to the outlet from the process zone and, conversely, as far as is convenient from the inlet to the carbon separation zone. Similarly, where, as is shown in FIGS. II and III, a particulate removal zone, e.g. 12 in FIG. II and 22 in FIG. III, is interposed between the process zone and the carbon contacting zone, the carbon should enter the conduit which comprises the carbon contacting zone at a point which is as close as possible to where the conduit passes out from the particulate removal zone.

Returning, now, to a consideration of the process of this invention as illustrated in FIG. II, the carbon storage zone 6 may comprise any suitable vessel or container capable of storing and feeding the activated carbon into the carbon contacting zone 4. The storage zone may be either open or covered and may operate by any suitable means such, for example, as by the use of pressure created by an inert gas although a gravity feed is generally preferred. The carbon flow regulator 7 may comprise any suitable valve or other means, such as a star feeder or vibrating internal baffle, for conveniently controlling the rate at which the activated carbon particles are fed into the carbon contacting zone. The amount of activated carbon fed to the carbon contacting zone will, in general, be determined by the degree of loading of the effluent and the time of contact in the contact zone. The amount of activated carbon may be varied from between about 1.5 to about 20 times the amount of carbon required to adsorb the odorous component(s) in the effluent stream. The amount of activated carbon introduced into the carbon contacting zone is not critical as long as at least about 1.5 times the amount of carbon necessary to adsorb the odorous components is utilized. The use of a feed rate which is at least about three times that required to adsorb the odorous composition being preferred. Since the amounts of odorous components in the gas stream are small it is usually necessary to utilize large excesses of activated carbon as feed to the contacting zone since it is difficult to continuously and accurately introduce extremely small quantities of a solid into the system. Large excesses of carbon are not harmful and can aid in reducing the size of the contacting zone required. The carbon separated from the gas stream can be recycled along with the fresh carbon feed to provide a carbon feed stream which can be accurately and continuously introduced into the process. The finely divided, activated carbon applicable for use in the process of this invention should have a particle size which is fine enough to permit it to be entrained in the effluent stream of exhaust gases. Thus, the use of a particle size of about 200 mesh (U.S. Sieve Series), or finer, is preferred.

It is to be noted that the use of activated carbon provides optimum results in the process of this invention. It is the preferred adsorbent.

The retention time during which it is necessary for the carbon particles to remain entrained in the effluent stream of the exhaust gases emerging from the process zone should be a period sufficient to remove all or substantially all of the odor forming components from the effluent. The precise length of this period will, of course, be dependent upon a variety of factors such, for example, as the contaminants being removed, the feed rate of the activated carbon, the flow rate of the effluent and the volume and configuration of the carbon contacting zone and cannot, therefore, be precisely specified.

In any event, after sufficient retention time has been achieved in the carbon contacting zone 4, the effluent passes into the carbon separation zone 8 wherein the effluent encounters a suitable means for removing the activated carbon particles as well as any other particulate contaminants which may be entrained therein. Devices applicable for use in the carbon separation zone include:

a. Filtration devices wherein particulate matter is removed from the effluent by retention of the particles in or on a porous structure or substrate through which the effluent flows. Filtration devices are well known in the art. Filtration devices of the envelope or the bag type, have been found effective for removing the particulate activated carbon from the gas stream.

b. Electrostatic precipitators which comprise devices in which one or more high intensity electrical fields are maintained so as to cause particles to acquire an electrical charge whereupon the charged particles are forced to a collecting surface. The collecting surface may be either dry or wet. Since the collecting force is applied to the particles and not to the gaseous phase of the effluent, the pressure drop of the effluent is only that of flow through a duct having the configuration of the collector. Hence, the pressure drop is very low and does not tend to increase with time. In general, collection efficiency increases with the length of passage through an electrostatic precipitator. Therefore, additional precipitator sections are often employed in series in order to obtain higher collection efficiency.

c. Cyclones which comprise devices in which organized vortex motion created within the collector provides the force to cause particles to be propelled to locations from which they may then be removed from the collector. They may be operated either wet or dry. Cyclones may either deposit the collected particulate matter in a hopper or concentrate it into a stream of effluent that flows to another separator, usually of a different type, for ultimate collection. As long as the interior of the cyclone remains clean, the pressure drop does not increase with time. Up to a certain limit, both collection efficiency and pressure drop increase with flow rate through a cyclone. Beyond that limit, only pressure drop continues to increase with flow rate increase. Cyclones are frequently used in parallel and occasionally in series.

d. Mechanical collectors other than cyclones including devices which collect particulate matter by gravity or centrifugal force but which do not depend upon a vortex as in the case of cyclones. These devices include settling chambers, baffled chambers, louvered chambers and devices in which the effluent particulate matter mixture passes tharough a fan in which separation occurs. In general, collectors of this class are of relatively low collection efficiency. They are frequently used as pre-cleaners preceding other types of collectors.

e. Scrubbers which comprise devices in which contact with a liquid introduced into the collector for the purpose of such contact is the prime means of collection. Although scrubbers are primarily employed to remove gases and vapor phase contaminants from the effluent or carrier gas, they also are used to remove particulate matter. The liquid may either dissolve or chemically react with the contaminant collected. Methods of effecting contact between scrubbing liquid and effluent include spraying the liquid into open chambers or into chambers containing various forms of baffles, grillage or packing; flowing the liquid into these structures over weirs; bubbling the gas through tanks or troughs of liquid and, utilizing effluent flow to create droplets from liquid introduced at a point of high effluent velocity. The liquid can frequently be recirculated to the scrubber after partial or complete removal of the collected contaminant from the liquid. In other cases, all or part of the liquid can be discarded to waste or it can, preferably, be recycled for further use.

It is to be noted, at this point, that although the process of this invention will, in most instances, incorporate a carbon separation zone, a carbon separation zone is not required to accomplish the substantial removal of obnoxious and unpleasant odorous components from the gas stream. In some situations the use of such a zone may not be required if the presence of the finely divided activated carbon in the vented effluent stream is not considered to be objectionable. Under such conditions, the effluent stream would be vented directly into the atmosphere subsequent to its passage through the carbon contacting zone.

As is illustrated in FIG. III, the process of this invention may, if desired, include the use of a secondary separation zone 28 which may comprise one or more additional means for removing particulate matter from the effluent. Suitable devices for use in this zone may include any one or more of the various types of apparatus which have been described as applicable for use in the carbon separation zone. Accordingly, the practitioner may have the effluent stream, subsequent to its treatment in the carbon contacting zone, pass through any desired number and types of devices for removing particulate and/or gaseous, vaporous or colloidal solid odor forming contaminants. Moreover, while each of the various zones which comprise the required and optional components of the process of this invention may be in the form of individual piece of equipment, it is also possible to design a suitable apparatus which would contain all of these zones within a single unit.

In still another preferred embodiment of this invention which is illustrated in FIGS. II and III, the effluent stream of exhaust gases may, if desired, be passed through a particulate removal zone, e.g. 12 in FIG. II and 22 in FIG. III, which contains suitable means for removing any particulate material which may be present within the effluent prior to its entry into the carbon contacting zone. Suitable devices for use in this zone may include any one or more of the various types of apparatus which have been described, hereinabove, as applicable for use in the carbon separation zone. Preferred for this purpose, however, is a fabric filter of the envelope or bag type since they can provide high collection efficiencies with low pressure drops.

In still another embodiment of the process of this invention, as illustrated in FIG. II, the activated carbon may be collected and thereafter conveyed from the carbon collection zone 17 into a carbon reactivation zone 18 where it will be reactivated, or regenerated as the process is sometimes referred to, prior to being recycled back into the carbon storage zone 15. The reactivation of the carbon may be accomplished by the use of any of the procedures, such as by the use of steam, which are well known to those skilled in the art; the particular regeneration treatment which is utilized being dependent upon the nature of the particulate contaminant or contaminants which have become adsorbed during the time the carbon particles were entrained in the effluent stream in its passage through the carbon contacting zone.

Moreover, in still another variation of the subject process which is shown in FIG. III, the contaminated carbon particles may, if desired, be directly recycled, via a suitable conduit 30, back into the effluent stream prior to the entry of the effluent into the carbon contacting zone 23. Such a recycling will serve to increase the efficiency of the process by permitting the carbon to adsorb additional concentrations of contaminants. If such a direct recycling of the contaminated carbon is utilized, the recycling conduit should preferably incorporate a bleed stream 31, or purge, in order to permit the removal, when necessary, of excess concentrations of the contaminated carbon from the system.

It should also be noted that the process of this invention may be carried out in a manner whereby the effluent streams from two or more process zones, each of which may be producing different end products, are combined and thereafter passed into the carbon contacting zone.

The following examples will further illustrate the embodiment of this invention. In these examples, all parts given are by weight unless otherwise noted.

EXAMPLE I

This example illustrates the operation of the odor control process of this invention.

In the process of manufacturing O,O-diethyl O-(2-isopropyl -4-methyl-6-pyrimidinyl) phosphorothioate, the latter compound being widely utilized as an insecticide, various odor forming compounds, including alkyl mercaptans, mercaptoacetates, thiophosphates, and mercaptophosphates are believed formed as by-products of the reaction and decomposition products of the compound. The preparation of agricultural formulations using this compound involves blending it with an inert carrier which is usually finely divided, hydrated synthetic calcium silicate sold under the trademark "MICRO-CEL" by Johns-Mansville Products Corp. The phosphorothioate is mixed with the synthetic calcium silicate in a high intensity mixer and the product is air classified. The large particles are returned to the mixing means to be reduced in size. During the blending and classification a significant quantity of the particulate material is entrained in the air stream utilized in the apparatus. About 8,000 cubic feet per minute of air enters the odor control apparatus from the mixer and area near the mixer. The exhaust gases are passed to a filtration type dust collector in which about 2,213 pounds per day of "MICRO-CEL" containing the phosphorothioate is separated from the gas stream. The gas stream leaving has an obnoxious and upleasant odor and carries about 1.65 pounds per day of the phosphorothioate adsorbed on the " MICRO-CEL," out of the dust collector. In addition to the odorous components, the exhaust gas stream contains unadsorbed phosphorothioate vapor.

In an attempt to control the odor problem, a catalytic burning unit which utilized a platinum catalyst to thermally degrade the odorous materials at 800°F. was installed in the effluent stream subsequent to its exit from the bag type, fabric filter dust collector. The catalytic combustion system did not markedly reduce the amount of obnoxious and disagreeable odor being vented into the atmosphere.

In another attempt to solve the odor problem, the gas stream was contacted with 2 percent sulfuric acid solution as a scrubbing medium in a liquid scrubber subsequent to its exit from the bag type, fabric filter. Liquid scrubbing also failed to reduce to acceptable levels the highly objectionable odor in the effluent stream which was being vented into the atmosphere. The liquid scrubbing also created a liquid waste disposal problem.

A system incorporating the process of this invention was then installed. This system involved the passage of the effluent stream from the final mixing unit used in preparing the above described phosphorothioate through a primary dust collector which comprised a bag type, fabric filter apparatus having a capacity of 8,000 cubic feet per minute (CFM) and an air-to-fabric ratio of 7 CFM per square foot of fabric area. This device was used with a 12-ounce dacron sock as a filtering medium. As noted above, the gas stream entering this collector contained 2,213 pounds per day of particulate matter. The effluent stream emerging from this primary dust collector entered a conduit having an inner diameter of 20 inches and a length of 57 feet which led into a secondary dust collector. At a point 15 feet from the primary dust collector outlet, minus 325 mesh (U.S. Sieve Series) activated carbon sold under the trade name Darco S-51 was fed into the above described conduit at a rate of about 6 pounds per day. At the end of the conduit the gas stream was devoid of the unpleasant odor associated with the phosphorothioate. The gas stream entered a secondary dust collector.

Upon emerging from the secondary dust collector, which was a bag type, fabric filter comprising a 12 ounce, felted cotton sock having an air-to-fabric ratio of 1.5 CFM per square foot of fabric, the effluent stream which was being vented into the atmosphere was found to be devoid of the objectionable mercaptan type odor with only a light naphtha odor, which was readily dispersable within only about 30 feet from the vent, being emitted into the atmosphere so that it was completely undetectable at a distance of 200 feet from the vent. By contrast, when using either the catalytic burning unit or the liquid scrubber, as described hereinabove, at a 1:1 dilution, the effluent being vented into the atmosphere could be detected at a distance of a one-fourth mile using a Model I-3 Barnaby Cheney Scentometer.

Comparable results, with respect to the reduction of odor, were attained by the application of the above described process to the effluent stream derived from the manufacture of formulations containing each of the following products:

1. The herbicide ethyl-N,N-di-n-propyl-thiocarbamate;
2. The herbicide S-ethyl diisobutylthiocarbamate;
3. The insecticide O-ethyl-S-phenylethylphosphonodithioate;
4. The insecticide O,O-dimethyl S-phthalimidomethyl phosphorodithioate;
5. The insecticide S-([(p-chlorophenyl)thio]methyl) O,O-diethyl phosphorodithioate;
6. The insecticide S-([(p-chlorophenyl)thio]methyl) O,O-dimethyl phosphorodithioate;
7. The herbicide S-(O,O-diisopropyl phosphorodithioate) of N-(2-mercaptoethyl) benzenesulfonamide;
8. The herbicide S-ethyl cyclohexyl ethyl thiocarbamate;
9. The herbicide S-propyl butyl ethylthiocarbamate;
10. The herbicide S-propyl dipropylthiocarbamate;
11. The insecticide tetra-n-propyl dithiopyrophosphate;
12. The herbicide S-ethyl dipropylthiocarbamate;
13. The insecticide, O,O-diethyl S-(ethylthio) methyl phosphorodithioate; and
14. The herbicide hexahydro-H-azepine-hexahydro-h-azepine 1-carbothioate.

EXAMPLE II

The process of the invention is effective to remove combinations of odorous materials from a gas stream. The process of example I for blending O,O-diethyl O-(2-isopropyl-4-methyl-6-pyrimidinyl) phosphorothioate with "MICRO-CEL" was in operation. Several cans of a blend of O,O-dimethyl S-phthalimidomethyl phosphorodithioate on "MICRO-CEL" were opened and placed in a dust collector and several drums of technical O,O-dimethyl S-phthalimidomethyl phosphorodithioate were opened and placed adjacent to the air inlet of a dust collector. About 8,000 cubic feet per minute of air was drawn through the system. The carbon feed to the adsorption zone was cut off. Within 15 minutes the characteristic unpleasant odor associated with both phosphorothioates were detectable in the gas at the outlet of the adsorption zone. The activated carbon feed was started at a rate of 20 pounds per day of −200 mesh Darco S-51 into the 20 inch diameter 57 feet long duct. In less than a minute the unpleasant odor associated with the 2 phosphorothioates was undetectable at the end of the duct.

The unpleasant odors associated with more than one composition can be simultaneously removed from the gas stream by the odor control method of the present invention.

EXAMPLE III

The apparatus of Example I was in service preparing a mixture of O,O-diethyl O-(O-(2-isopropyl-4-methyl-6-pyrimidinyl) phosphorothioate on "MICRO-CEL." About 8,000 cubic feet a minute of gas was entering the dust collector and odor control system. Darco S-51 activated carbon of a particle size minus 200 mesh (U.S. Sieve Series) was fed into the 57 foot duct which connects the primary and secondary dust collectors at a point 15 feet from the outlet of the primary dust collector at a rate of 9.6 pounds per day. The unpleasant odor associated with the phosphorothioate was not detectable at the entrance to the secondary dust collector.

The air stream was sampled at the discarge of the primary dust collector at the entrance of the secondary dust collector and at the exit of the secondary dust collector. The samples were analyzed by gas chromatography. The only significant peak in the chromatographic analysis was that of the phosphorothioate.

The O,O-diethyl O-(2-isopropyl-4-methyl-6-pyrimidinyl) phosphorothioate loading of the gas stream was as follows:

Outlet Primary Dust Collector—0.305 parts per million

Inlet Secondary Dust Collector—0.126 parts per million

Outlet secondary Dust Collector—0.0216 parts per million

Although the loading of the O,O-diethyl O-(2-isopropyl-4-methyl-6-pyrimidinyl) phosphorothioate was relatively high at the inlet of the secondary dust collector, the unpleasant and obnoxious odor associated with the phosphorothioate had been removed from the gas stream.

The only significant peak which appeared in any of the gas chromatographs was that associated with the phosphorothioate.

The components of the gas stream with the obnoxious odor did not appear in the gas chromatographic analysis. The most reliable method for determining the presence or absence of the obnoxious and unpleasant odor is by smell.

The analysis indicates that the odorous materials are preferentially adsorbed from the gas stream since the amounts of the major component remained in the gas stream to a significant degree at the end of the adsorption zone where the gas stream enters the secondary dust collector. At this point the odor of the gas stream indicated that the obnoxious and unpleasant odors had been removed from the gas stream.

EXAMPLE IV

The apparatus of Example I was utilized to prepare a formulation of O,O-diethyl O-(2-isopropyl-4-methyl-6-pyrimidinyl) phosphorothioate. About 8,000 cubic feet per minute of air enter the dust collection and odor control system. Darco S-51 activated carbon of minus 200 mesh (U.S. Sieve Series) was fed into the 20 inch diameter duct at a rate of 14.4 pounds per day at a point 15 feet downstream for the primary dust collector. The air stream was sampled at the outlet of the primary dust collector, at the inlet of the secondary dust collector and at the outlet of the secondary dust collector.

The O,O-diethyl O-(2-isopropyl-4-methyl-6-pyrimidinyl) phosphorothioate loading of the gas stream was as follows:

Outlet Primary Dust Collector—0.52 parts per million

Inlet Secondary Dust Collector—0.24 parts per million

Outlet Secondary Dust Collector—0.016 parts per million

The gas stream at the outlet of the primary dust collector had the strong obnoxious and unpleasant smell associated with the phosphorothioate. The unpleasant and obnoxious odor was not present at the inlet to the secondary dust collector. The gas stream had a pleasant naptha like odor at this point.

The loading of the phosphorothioate in the gas stream at the inlet to the secondary dust collector was near the level of the phosphorothioate in the gas stream at the outlet of the primary dust collector in Example III. The gas stream, however, did not have the unpleasant and obnoxious odor which was present in the gas stream at the outlet of the primary dust collector in Example III. The activated carbon preferentially adsorbed the materials which impart the obnoxious and unpleasant odors to the gas stream.

Variations may be made in proportions, procedures and materials without departing from the scope of this invention as defined in the following claims.

What is claimed is:

1. A method for controlling the unpleasant and obnoxious odor in a gas stream which arises during manufacture and preparation of herbicide and pesticide compositions selected from the group consisting of organic pesticide and herbicide compositions containing sulfur in combination with an element selected from the group consisting of nitrogen, phosophorous and oxygen in the molecule, said method comprising contacting said composition with a gas stream and passing the gas stream which has contacted the herbicide and pesticide compositions through a carbon contacting zone into which particles of finely divided activated carbon are fed so that they make contact with and are entrained in said gas stream for a sufficient length of time to reduce the obnoxious and unpleasant odor in the gas stream.

2. The method of claim 1, wherein the activated carbon is fed into said carbon contacting zone at a feed rate which is from about two to 20 times the rate necessary to adsorb the odorous compositions from the gas stream.

3. The method of claim 1, wherein said pesticide and herbicide compositions are selected from the group consisting of:

O,O-diethyl O-(2-isopropyl-4-methyl-6-pyrimidinyl) phosphorothioate;
Ethyl-N,N-di-n-propylthio carbamate;
S-ethyl diisobutylthiocarbamate;
O-ethyl-S-phenylethylphosphonodithioate;
O,O-dimethyl S-phthalimidomethyl phosphorodithioate;
S-([(p-chlorophenyl thio]methyl) O,O-diethyl phosphorodithioate;
S-([(p-chlorophenyl)thio]methyl) O,O-dimethyl phosphorodithioate;
S-(O,O-diisopropyl phosphorodithioate) of N-(2-mercaptoethyl) benzenesulfonamide;
S-ethyl cyclohexyl ethyl thiocarbamate;
S-propyl butyl ethylthiocarbamate;
S-propyl dipropylthiocarbamate;
Tetra-n-propyl dithiopyrophosphate;
S-ethyl dipropylthiocarbamate;
O,O-diethyl S-(ethylthio) methyl phosphorodithioate; and,
S-ethyl hexahydro-H-azepine-1-carbothioate.

4. The method of claim 1 wherein the herbicide and pesticide composition is selected from the group consisting of phosphorothioate, phosphorodithioate, phosphonothioate, phosphonodithioate, and thiolcarbamate.

5. The method of claim 1, wherein the gas stream passes through a particulate removal zone prior to passing through said carbon contacting zone; said particulate removal zone containing suitable means for removing particulate matter from said gas stream.

6. The method of claim 5, wherein said particulate removal zone comprises at least one fabric filter.

7. The method of claim 6, wherein said fabric filter is coated with a layer of adsorbant material on at least one surface thereof.

8. The method of claim 5, wherein the gas stream passes through a carbon separation zone subsequent to passing through said carbon contacting zone and prior to being vented into the atmosphere; said carbon separation zone containing suitable means for separating activated carbon from the gas stream.

9. The method of claim 8 wherein said carbon separation zone comprises at least one fixed bed of activated carbon.

10. The method of claim 1, wherein the gas stream passes through a carbon separation zone subsequent to passing through said carbon contacting zone and prior to being vented into the atmosphere; said carbon separation zone containing suitable means for removing said particles of finely divided activated carbon as well as other particulate materials from said gas stream.

11. The method of claim 10, wherein said carbon separation zone comprises at least one fabric filter.

12. The method of claim 10, wherein the activated carbon removed from the gas stream in said carbon separation zone is recycled back into the gas stream at a point subsequent to its contact with the herbicide and pesticide compositions.

13. The method of claim 1, wherein the gas stream which has contacted the herbicide and pesticide compositions passes through a particulate removal zone prior to passing through said activated carbon contacting zone and thereafter also passes through an activated carbon separation zone subsequent to passing through said carbon contacting zone and prior to being vented into the atmosphere; said particulate removal zone and said activated carbon separation zone both containing suitable means for removing particulate material from said gas stream.

14. The method of claim 13, wherein said particulate removal zone and said carbon contacting zone each comprise at least one fabric filter.

15. The method of claim 14, wherein said fabric filter in said particulate removal zone is precoated with a layer of particulate material on at least one surface thereof.

16. The method of claim 15, wherein said fabric filter in said activated carbon removal zone is precoated with a layer of activated carbon on at least one surface thereof.

17. A method of controlling the odor of the gas stream which is discharged into the atmosphere during the manufacture and formulation of herbicides and insecticides composition selected from the group consisting of:

O,O-diethyl O-(2-isopropyl-4-methyl-6-pyrimidinyl) phosphorothioate;
Ethyl-N,N-di-n-propylthio carbamate;
S-ethyl diisobutylthiocarbamate;
O-ethyl-S-phenylethylphosphonodithioate;
O,O-dimethyl S-phthalimidomethyl phosphorodithioate;
S-{[(p-chlorophenyl)thio]methyl) O,O-diethyl phosphorodithioate;
S-{[(p-chlorophenyl)thio]methyl) O,O-dimethyl phosphorodithioate;
S-(O,O-diisopropyl phosphorodithioate) of N-(2-mercaptoethyl) benzenesulfonamide;
S-ethyl cyclohexyl ethyl thiocarbamate;
S-propyl butyl ethylthiocarbamate;
S-propyl dipropylthiocarbamate;
Tetra-n-propyl dithiopyrophosphate;
S-ethyl dipropylthiocarbamate;
O,O-diethyl S-(ethylthio) methyl phosphorodithioate; and,
S-ethyl hexahydro-H-azepine-1-carbothioate;

said method comprising passing the gas stream for the apparatus used in preparing said herbicide and insecticide compositions through an activated carbon contacting zone into which particles of finely divided activated carbon are fed so as to make contact with and are entrained in said gas stream, said particles thereby adsorbing odor forming components from said effluent stream while they are entrained therein; said effluent thereafter being vented into the atmosphere.

18. The method of claim 17, wherein the activated carbon is fed into said activated carbon contacting zone at a feed rate which is from about two to 20 times the rate necessary to adsorb the odorous components from the gas stream.

19. The method of claim 17, wherein the gas stream passes through a particulate removal zone prior to passing through said carbon contacting zone; said particulate removal zone containing suitable means for removing particulate matter from said gas stream.

20. The method of claim 19, wherein said particulate removal zone comprises at least one fabric filter.

21. The method of claim 20, wherein said fabric filter is precoated with a layer of activated carbon on at least one surface thereof.

22. The method of claim 17, wherein the gas stream passes through said activated carbon separation zone subsequent to passing through said activated carbon contacting zone and prior to being vented into the atmosphere; said activated carbon separation zone containing suitable means for removing said particles of finely divided activated carbon as well as other particulate materials from said effluent.

23. The method of claim 22, wherein said carbon separation zone comprises at least one fabric filter.

24. The method of claim 22, wherein the activated carbon removed from the gas stream in said activated carbon separation zone is recycled back into the gas stream at a point subsequent to its contact with the pesticide and herbicide compositions, but prior to its entry into said activated carbon contacting zone.

25. The method of claim 16, wherein the gas stream passes through a particulate removal zone prior to passing through said activated carbon contacing zone and thereafter also passes through an activated carbon separation zone subsequent to passing through said activated carbon contacting zone and prior to being vented into the atomopshere; said particulate removal zone and said activated carbon separation zone both containing suitable means for removing particulate material from said effluent.

26. The method of claim 25, wherein said particulate removal zone and said activated carbon contacting zone each comprise at least one fabric filter.

* * * * *

PO-1050
(5/69)

UNITED STATES PATENT OFFICE
CERTIFICATE OF CORRECTION

Patent No. 3,798,877          Dated March 26, 1974

Inventor(s) Norman C. Lamb

It is certified that error appears in the above-identified patent and that said Letters Patent are hereby corrected as shown below:

In the specification, column 4, line 16, after, propylene, delete "S-(and" and insert -- (diethoxyphosphinothioyl)dithioimidocarbonate -- after S- second occurrence, enter -- (and --. Column 8, line 53, conecntrate should read -- concentrate --. Column 11, line 12, Figure II, should read -- Fig. I --. Column 12, line 55, delete "thorough" and insert -- through --. Column 15, line 29, after, S-51, insert -- TM --. Column 16, line 12, at beginning of line, insert -- S-ethyl -- and after, azepine, first occurrence, delete "-hexahydro-h-azepine"; line 33, after S-51, insert -- TM --; line 47, after, S-51, insert -- TM--. Column 17, line 30, after S-51, insert -- TM --. Column 20, line 5, after, stream, delete "for" and insert -- from --; line 30, after, through, delete "said" and insert -- an --.

Signed and sealed this 24th day of September 1974.

(SEAL)
Attest:

McCOY M. GIBSON JR.          C. MARSHALL DANN
Attesting Officer          Commissioner of Patents